United States Patent [19]
Rosenwach

[11] 3,724,127
[45] Apr. 3, 1973

[54] HORIZONTALLY ORIENTED PLANTER

[76] Inventor: Wallace Rosenwach, 2 Harbow Road, Great Neck, N.Y. 11024

[22] Filed: Nov. 11, 1971

[21] Appl. No.: 197,658

[52] U.S. Cl. ..................47/34, D35/3 A, 217/95
[51] Int. Cl. .............................................A01g 9/02
[58] Field of Search....D35/3 A; D29/28 R; D13/1 R, D13/4; 47/34–35, 39; 217/88, 95; D49/29, 33

[56] References Cited

UNITED STATES PATENTS

| | | | |
|---|---|---|---|
| 1,070,497 | 8/1913 | Lewis | 217/95 |
| 1,357,738 | 11/1920 | Squires | 47/35 |
| 1,405,568 | 2/1922 | Conklin | 47/34 |
| 1,932,748 | 10/1933 | Peck et al. | 47/34 |
| D166,418 | 4/1952 | Sandkuhle | D35/3 A |
| D166,419 | 4/1952 | Sandkuhle | D35/3 A |
| 3,370,379 | 2/1968 | Gleason | 47/34 |

Primary Examiner—Robert E. Bagwill
Attorney—Charles E. Temko

[57] ABSTRACT

A planter for flowers and the like comprising a first plurality of longitudinal members of arcuate cross section, each having mating tongue and groove means on side surfaces thereof, and extending the entire length of said planter. A second plurality of members of shorter length are positioned in arcuate juxtaposed relation with said first plurality at each end of the latter to define an opening therebetween. A tensioned strap means surrounds the first and second members at each end of the opening. Each of the first and second members is provided with a groove on an inwardly disposed surface to engage one of first and second end wall members which are provided with a corresponding tongued peripheral area engageable therewith. The device relies upon the constrictive forces of the strap members to maintain it in assembled condition, in the absence of any gluing.

1 Claim, 6 Drawing Figures

PATENTED APR 3 1973 3,724,127
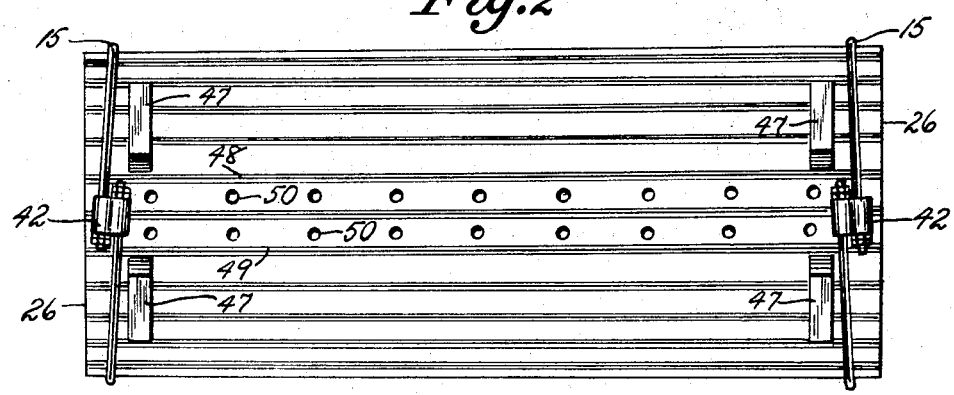
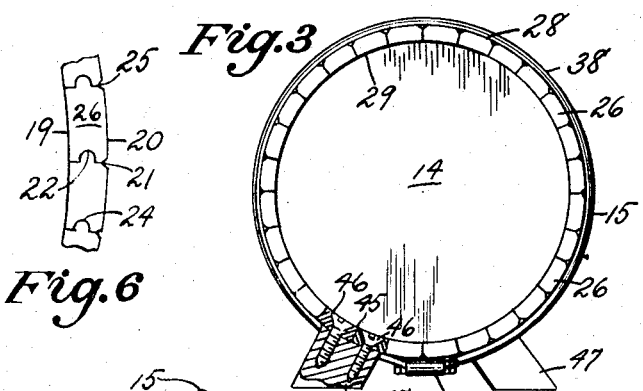
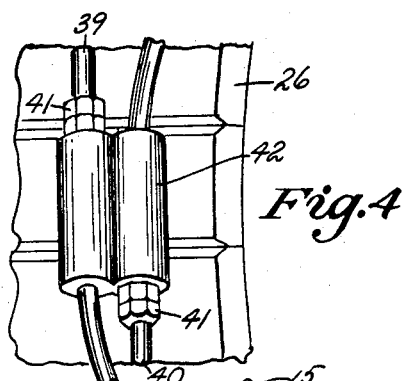

HORIZONTALLY ORIENTED PLANTER

This invention relates generally to the field of decorative floral planters, and more particularly to an improved form thereof of barrel or tank-like configuration.

It is among the principal objects of the present invention to provide an improved form of planter offering a novel and decorative external appearance.

Another object of the invention lies in the provision of an improved floral planter of the class described which may be conveniently manufactured with a complete absence of gluing or nailing operations, and which may be maintained in assembled condition solely as the result of constrictive forces which are placed upon the component parts.

Yet another object of the invention lies in the provision of an improved floral planter in which the cost of fabrication may be of a reasonably low order, which consequent wide sale, distribution and use.

These objects, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIG. 1 is a view in perspective of an embodiment of the invention.

FIG. 2 is a bottom plan view thereof, as seen from the lower portion of FIG. 1.

FIG. 3 is an end elevational view thereof, partly broken away to show detail.

FIG. 4 is an enlarged fragmentary bottom plan view corresponding to the right hand portion of FIG. 2.

FIG. 5 is a longitudinal central sectional view as seen from the plane 5—5 in FIG. 1.

FIG. 6 is an enlarged fragmentary end elevational view corresponding to the right hand portion of FIG. 3.

In accordance with the invention, the device, generally indicated by reference character 10, comprises broadly: a first plurality of longitudinal members 11, a second plurality of longitudinal members 12, end wall members 13 and 14, strap elements 15 and leg members 16.

The first plurality of longitudinal members 11 are substantially similar, each having an arcuately shaped cross section best seen in FIG. 6. Each member is bounded by an inner surface 19, an outer surface 20, a first side surface 21 having a longitudinally extending groove 22 therein, and a second side surface 23 having a corresponding longitudinally extending tongue 24. Simulated V-joints 25 may be applied to the outer surface 20, where desired for decorative appearance. The end surfaces 26 are oppositely disposed and symmetrical. A transverse groove 27 extends inwardly from the inner surface 19 between the side surfaces 21-23.

The second plurality of members 12 are similar to the first plurality 11, but are of considerably shorter length, each being bounded by outer surfaces 28, inner surfaces 29, first and second end surfaces 30-31, respectively, and including a transversely extending groove 32.

The end wall members 13-14 are similar, each being of curvilinear configuration and bounded by an inner surface 34, and outer surface 35, a peripheral surface 36 and a rabbetted portion 37.

The strap members 15 each include a length of flexible steel wire 38 having first and second threaded ends 39-40 engagable with nuts 41. An interconnecting sleeve member 42 includes a pair of parallel bores through which the ends 40 are threaded, engagement of the nuts 41 and the tightening thereof causing the wire 38 to exert a constricting force on the assembled device.

The leg members 16 are bounded by an arcuate surface 45 penetrated by screws 46 extending through certain of the members forming the first plurality 11, and a planar surface 47 engaging a horizontal surface (not shown).

Referring to FIG. 2, the lower-most members 48 and 49 of the first plurality 11 are provided with drain holes 50 in the area between the leg members 16, whereby excessive moisture may be dissipated.

The device is assembled as best understood from the consideration of FIG. 5, in which the first plurality 11 are placed in juxtaposed relation with the tongues 24 engaging the grooves 22 of adjoining members. The second plurality 12 are assembled to engage in conjunction with the first plurality the end wall members 13 and 14, following which the strap members 15 are placed in surrounding relation and tightened. Owing to the fact that the second plurality 12 each engage the end wall members 13 and 14, and the compressive force of the strap is resisted by the engagement of the lower-most of the second plurality 12 against the first plurality 11, the entire device is self-supporting and maintains itself in assembled condition without resort to gluing or nailing.

The second end surfaces 31 of the second plurality in conjunction with the free edges 52 and 53 define an opening through which the cavity formed by the first plurality 11 may be filled. Preferably the tongue and groove construction is eliminated from the exposed side surfaces of the upper most of the first plurality 11 for purposes of appearance.

I wish it to be understood that I do not consider the invention limited to the precise details of structure shown and set forth in this specification, for obvious modifications will occur to those skilled in the art to which the invention pertains.

I claim:

1. A wood planter construction comprising: a first plurality of longitudinal members, each having a curvilinear cross section, and bounded by inner and outer surfaces, a first side surface having a longitudinal groove therein, and a second longitudinal surface having a corresponding tongue thereon; a second plurality of longitudinal members of substantially identical configuration, and of shorter length than said first plurality, each of said first and second plurality of members having a groove extending transversely into an inner surface thereof between said side surfaces in an area adjacent end surfaces thereof; a pair of circular end wall members, each having means engaging said last mentioned grooves, said first and second pluralities of members being mutually abutted in parallel orientation, with the tongue of one member engaged in the groove of an adjacent member, and the end walls engaged in a transverse groove of each; a pair of elongated tension elements encircling said first and second pluralities of members to retain them in assembled condition at each end of the first plurality, said second plurality of members in assembled condition defining a generally rectangularly 1 shaped opening leading to a cavity formed by said plurality of members.

* * * * *